US012640852B2

(12) United States Patent
Wu et al.

(10) Patent No.: US 12,640,852 B2
(45) Date of Patent: May 26, 2026

(54) REDUCTION OF DUPLICATE ACKNOWLEDGMENTS

(71) Applicant: QUALCOMM Incorporated, San Diego, CA (US)

(72) Inventors: Peng Wu, Shanghai (CN); Shailesh Maheshwari, San Diego, CA (US); Arnaud Meylan, San Diego, CA (US); Arun Prasanth Balasubramanian, San Diego, CA (US); Yuyi Li, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 18/549,888

(22) PCT Filed: May 17, 2021

(86) PCT No.: PCT/CN2021/094091
§ 371 (c)(1),
(2) Date: Sep. 8, 2023

(87) PCT Pub. No.: WO2022/241610
PCT Pub. Date: Nov. 24, 2022

(65) Prior Publication Data
US 2024/0305414 A1    Sep. 12, 2024

(51) Int. Cl.
*H04L 1/1829* (2023.01)
*H04L 1/1607* (2023.01)

(52) U.S. Cl.
CPC .......... *H04L 1/1841* (2013.01); *H04L 1/1642* (2013.01)

(58) Field of Classification Search
CPC ... H04L 1/1841; H04L 1/1642; H04L 1/1854; H04L 69/163
See application file for complete search history.

(56) References Cited

U.S. PATENT DOCUMENTS

| | | | | |
|---|---|---|---|---|
| 2016/0315868 A1* | 10/2016 | Zhang | .................... | H04L 47/624 |
| 2016/0337870 A1* | 11/2016 | Huang | .................. | H04L 1/1887 |
| 2017/0063498 A1* | 3/2017 | Venkatsuresh | .......... | H04L 69/16 |
| 2017/0070437 A9 | 3/2017 | Patel et al. | | |

FOREIGN PATENT DOCUMENTS

EP          2632102 A1      8/2013

OTHER PUBLICATIONS

International Search Report and Written Opinion—PCT/CN2021/094091—ISA/EPO—Nov. 11, 2021.

* cited by examiner

*Primary Examiner* — Jamal Javaid

(74) *Attorney, Agent, or Firm* — Holland & Hart LLP/Qualcomm

(57)          ABSTRACT

Methods, systems, and devices for wireless communications are described. A wireless node may receive one or more data messages which may include a set of packets that may each be associated with a sequence number. The set of packets may be received with a gap in the set of sequence numbers, indicating missing packets. The wireless node may forward the set of packets to a processing layer of the wireless node. The wireless node may then accept, from the processing layer of the wireless node, a set of duplicate (DUP) acknowledgment (ACK) messages based on the set of packets being forwarded to the processing layer while having the gap in the set of sequence numbers. The wireless node may transmit, a subset of the set of DUP ACKs rather than all of the set of DUP ACKs to another wireless node, such as a base station.

30 Claims, 11 Drawing Sheets

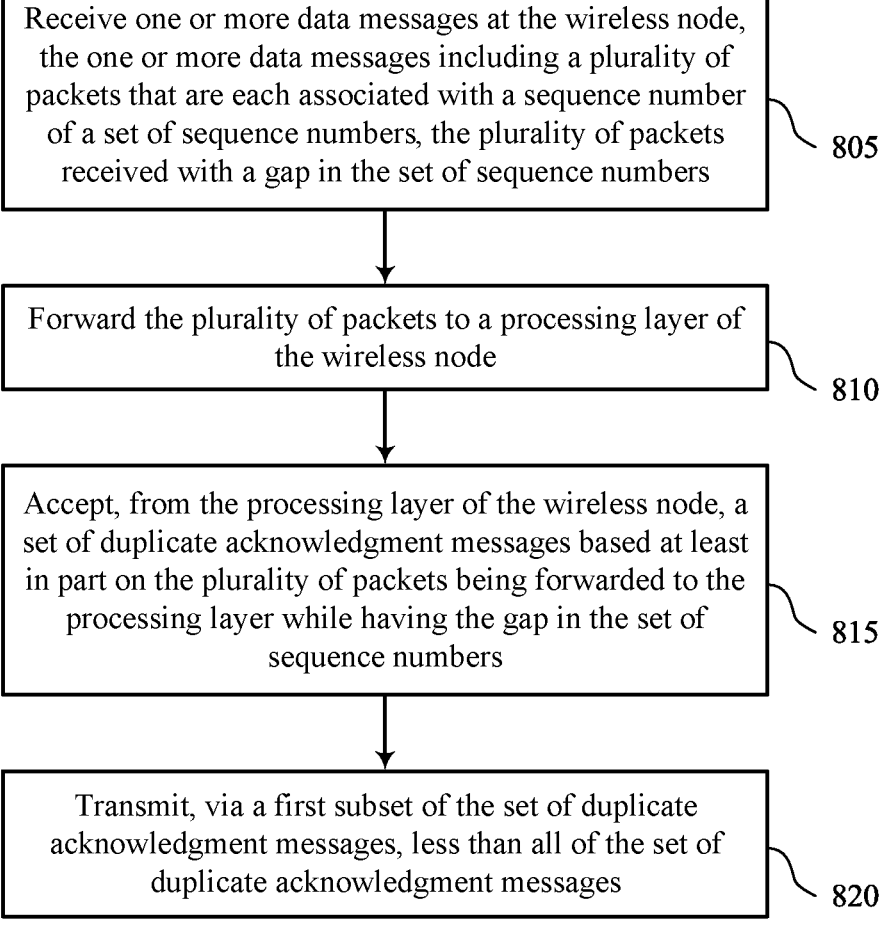

Receive one or more data messages at the wireless node, the one or more data messages including a plurality of packets that are each associated with a sequence number of a set of sequence numbers, the plurality of packets received with a gap in the set of sequence numbers

805

Forward the plurality of packets to a processing layer of the wireless node

810

Accept, from the processing layer of the wireless node, a set of duplicate acknowledgment messages based at least in part on the plurality of packets being forwarded to the processing layer while having the gap in the set of sequence numbers

815

Transmit, via a first subset of the set of duplicate acknowledgment messages, less than all of the set of duplicate acknowledgment messages

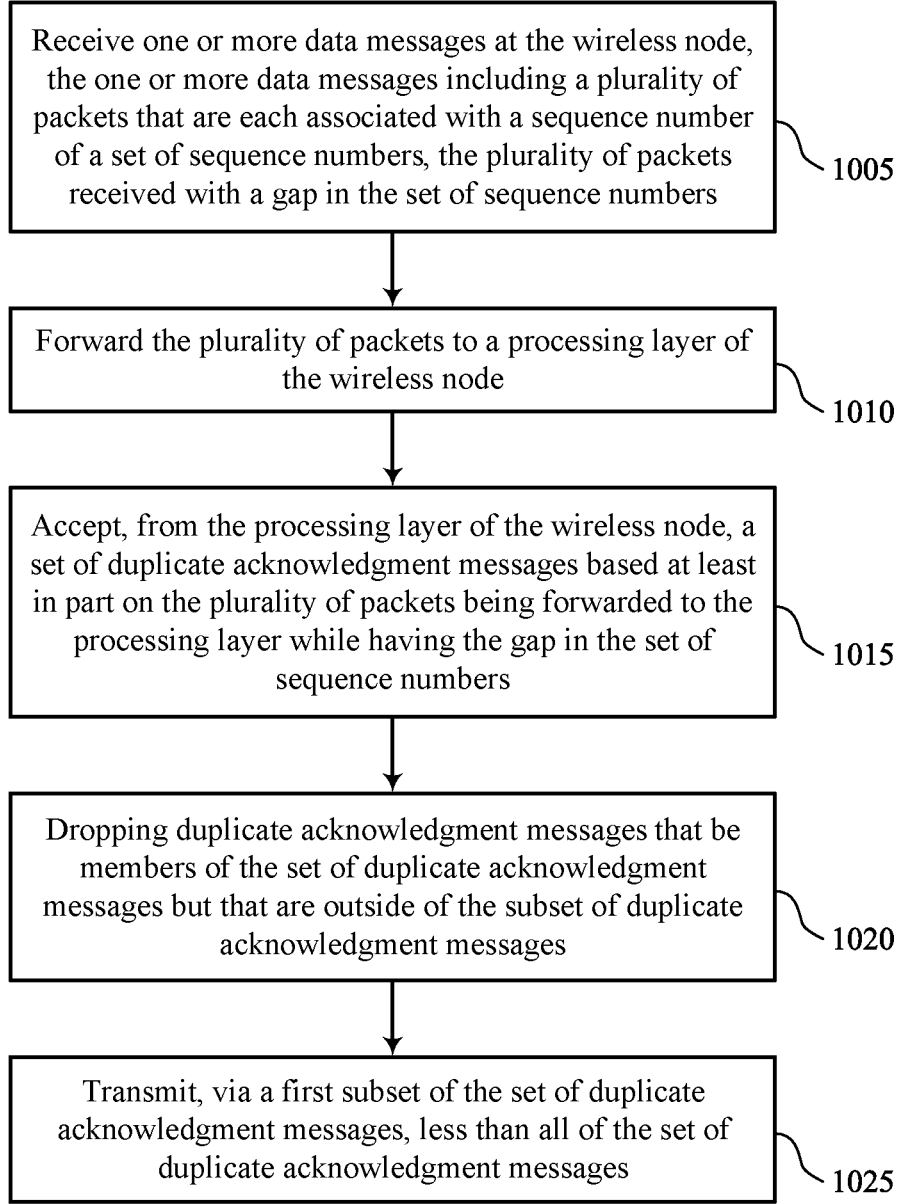

Receive one or more data messages at the wireless node, the one or more data messages including a plurality of packets that are each associated with a sequence number of a set of sequence numbers, the plurality of packets received with a gap in the set of sequence numbers
1005

Forward the plurality of packets to a processing layer of the wireless node
1010

Accept, from the processing layer of the wireless node, a set of duplicate acknowledgment messages based at least in part on the plurality of packets being forwarded to the processing layer while having the gap in the set of sequence numbers
1015

Dropping duplicate acknowledgment messages that be members of the set of duplicate acknowledgment messages but that are outside of the subset of duplicate acknowledgment messages
1020

Transmit, via a first subset of the set of duplicate acknowledgment messages, less than all of the set of duplicate acknowledgment messages
1025

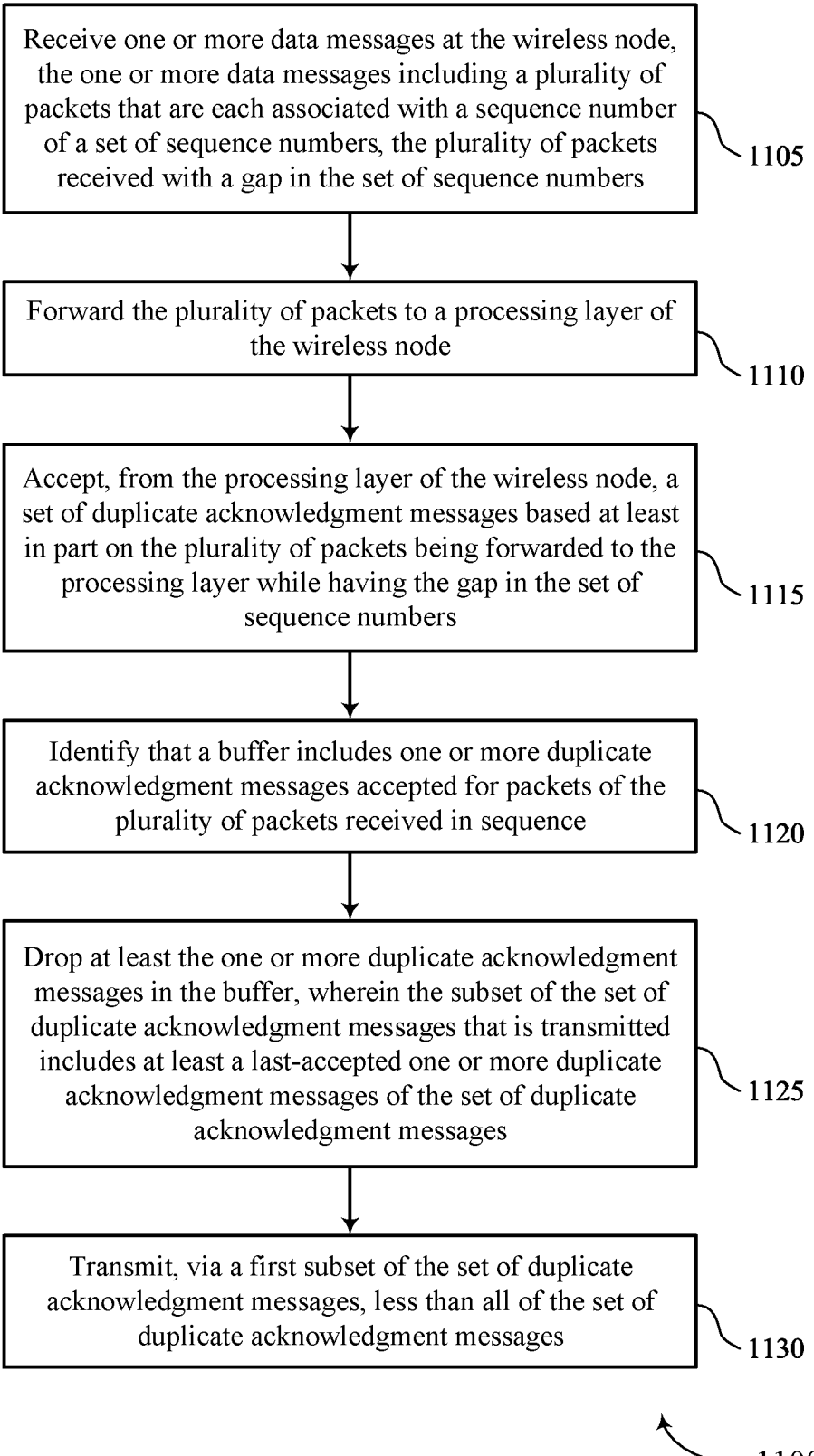

Receive one or more data messages at the wireless node, the one or more data messages including a plurality of packets that are each associated with a sequence number of a set of sequence numbers, the plurality of packets received with a gap in the set of sequence numbers — 1105

Forward the plurality of packets to a processing layer of the wireless node — 1110

Accept, from the processing layer of the wireless node, a set of duplicate acknowledgment messages based at least in part on the plurality of packets being forwarded to the processing layer while having the gap in the set of sequence numbers — 1115

Identify that a buffer includes one or more duplicate acknowledgment messages accepted for packets of the plurality of packets received in sequence — 1120

Drop at least the one or more duplicate acknowledgment messages in the buffer, wherein the subset of the set of duplicate acknowledgment messages that is transmitted includes at least a last-accepted one or more duplicate acknowledgment messages of the set of duplicate acknowledgment messages — 1125

Transmit, via a first subset of the set of duplicate acknowledgment messages, less than all of the set of duplicate acknowledgment messages — 1130

REDUCTION OF DUPLICATE ACKNOWLEDGMENTS

CROSS REFERENCE

The present application is a 371 national stage filing of International PCT Application No. PCT/CN2021/094091 by WU et al. entitled "REDUCTION OF DUPLICATE ACKNOWLEDGMENTS," filed May 17, 2021, which is assigned to the assignee hereof, and which is expressly incorporated by reference in its entirety herein.

FIELD OF TECHNOLOGY

The following relates to wireless communications, including reduction of duplicate acknowledgments.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may receive multiple transmission packets from a base station. Each transmission packet may be associated with a sequence number. The UE may receive packets with a gap in sequence numbers, indicating that some packets were not received at the UE. The UE may send duplicate (DUP) acknowledgments (ACKs) for each out of order packet, which may lead to inefficient use of uplink resources.

SUMMARY

The described techniques relate to improved methods, systems, devices, and apparatuses that support reduction of duplicate acknowledgments. Generally, the described techniques provide for a wireless node managing duplicate acknowledgement (ACK) messages in the case of missed packets. A wireless node may receive one or more data messages which may include a set of packets that may each be associated with a sequence number. The set of packets may be received with a gap in the set of sequence numbers, indicating missing packets. The wireless node may forward the set of packets to a processing layer of the wireless node. The wireless node may then accept, from the processing layer of the wireless node, a set of duplicate acknowledgment (ACK) messages based on the set of packets being forwarded to the processing layer while having the gap in the set of sequence numbers. The wireless node may transmit a subset of the set of DUP ACKs rather than all of the set of DUP ACKs to another wireless node, such as a base station.

A method for wireless communications at a wireless node is described. The method may include receiving one or more data messages at the wireless node, the one or more data messages including a set of multiple packets that are each associated with a sequence number of a set of sequence numbers, the set of multiple packets received with a gap in the set of sequence numbers, forwarding the set of multiple packets to a processing layer of the wireless node, accepting, from the processing layer of the wireless node, a set of DUP ACK messages based on the set of multiple packets being forwarded to the processing layer while having the gap in the set of sequence numbers, and transmitting, via a first subset of the set of DUP ACK messages, less than all of the set of DUP ACK messages.

An apparatus for wireless communications at a wireless node is described. The apparatus may include a processor, memory coupled with the processor, and instructions stored in the memory. The instructions may be executable by the processor to cause the apparatus to receive one or more data messages at the wireless node, the one or more data messages including a set of multiple packets that are each associated with a sequence number of a set of sequence numbers, the set of multiple packets received with a gap in the set of sequence numbers, forward the set of multiple packets to a processing layer of the wireless node, accept, from the processing layer of the wireless node, a set of DUP ACK messages based on the set of multiple packets being forwarded to the processing layer while having the gap in the set of sequence numbers, and transmit, via a first subset of the set of DUP ACK messages, less than all of the set of DUP ACK messages.

Another apparatus for wireless communications at a wireless node is described. The apparatus may include means for receiving one or more data messages at the wireless node, the one or more data messages including a set of multiple packets that are each associated with a sequence number of a set of sequence numbers, the set of multiple packets received with a gap in the set of sequence numbers, means for forwarding the set of multiple packets to a processing layer of the wireless node, means for accepting, from the processing layer of the wireless node, a set of DUP ACK messages based on the set of multiple packets being forwarded to the processing layer while having the gap in the set of sequence numbers, and means for transmitting, via a first subset of the set of DUP ACK messages, less than all of the set of DUP ACK messages.

A non-transitory computer-readable medium storing code for wireless communications at a wireless node is described. The code may include instructions executable by a processor to receive one or more data messages at the wireless node, the one or more data messages including a set of multiple packets that are each associated with a sequence number of a set of sequence numbers, the set of multiple packets received with a gap in the set of sequence numbers, forward the set of multiple packets to a processing layer of the wireless node, accept, from the processing layer of the wireless node, a set of DUP ACK messages based on the set of multiple packets being forwarded to the processing layer while having the gap in the set of sequence numbers, and transmit, via a first subset of the set of DUP ACK messages, less than all of the set of DUP ACK messages.

Some examples of the method, apparatuses, and non-transitory computer-readable medium described herein may further include operations, features, means, or instructions for identifying the first subset of the set of DUP ACK messages based on a number of DUP ACK messages within the set of DUP ACK messages.

Some examples of the method, apparatuses, and non-transitory computer-readable medium described herein may further include operations, features, means, or instructions for predicting a number of DUP ACK messages to be generated, identifying a last DUP ACK message to be accepted based on the predicting, and refraining from requesting an uplink grant for retransmission of the one or more data messages until after the last DUP ACK message may be accepted.

In some examples of the method, apparatuses, and non-transitory computer-readable medium described herein, dropping DUP ACK messages that may be members of the set of DUP ACK messages but that may be outside of the subset of DUP ACK messages.

Some examples of the method, apparatuses, and non-transitory computer-readable medium described herein may further include operations, features, means, or instructions for identifying that a buffer includes one or more DUP ACK messages accepted for packets of the set of multiple packets received in sequence and dropping at least the one or more DUP ACK messages in the buffer, where the subset of the set of DUP ACK messages that may be transmitted includes at least a last-accepted one or more DUP ACK messages of the set of DUP ACK messages.

Some examples of the method, apparatuses, and non-transitory computer-readable medium described herein may further include operations, features, means, or instructions for forwarding the set of multiple packets to the processing layer of the wireless node may be based on expiration of a packet data convergence protocol (PDCP) reorder timer expiry.

Some examples of the method, apparatuses, and non-transitory computer-readable medium described herein may further include operations, features, means, or instructions for forwarding the set of multiple packets to the processing layer of the wireless node may be based on radio link control (RLC) automatic repeat request (ARQ) and not on expiration of a packet data convergence protocol (PDCP) reorder timer expiry.

Some examples of the method, apparatuses, and non-transitory computer-readable medium described herein may further include operations, features, means, or instructions for maintaining one or more of the set of DUP ACK messages in a buffer while ARQ-recovered PDCP packets may be forwarded to the processing layer.

Some examples of the method, apparatuses, and non-transitory computer-readable medium described herein may further include operations, features, means, or instructions for accepting an additional DUP ACK message after expiration of the PDCP reorder timer, the additional DUP ACK message being added to the set of DUP ACK messages, dropping the one or more of the set of DUP ACK messages in the buffer, and transmitting the additional DUP ACK message as the subset of DUP ACK messages.

In some examples of the method, apparatuses, and non-transitory computer-readable medium described herein, transmitting the first subset of the set of DUP ACK messages may include operations, features, means, or instructions for transmitting the one or more of the set of DUP ACK messages that may be in the buffer as the subset of DUP ACK messages.

BRIEF DESCRIPTION OF THE DRAWINGS

FIGS. 8 through 11 show flowcharts illustrating methods that support reduction of DUP ACKs in accordance with aspects of the present disclosure.

DETAILED DESCRIPTION

Figure 1:
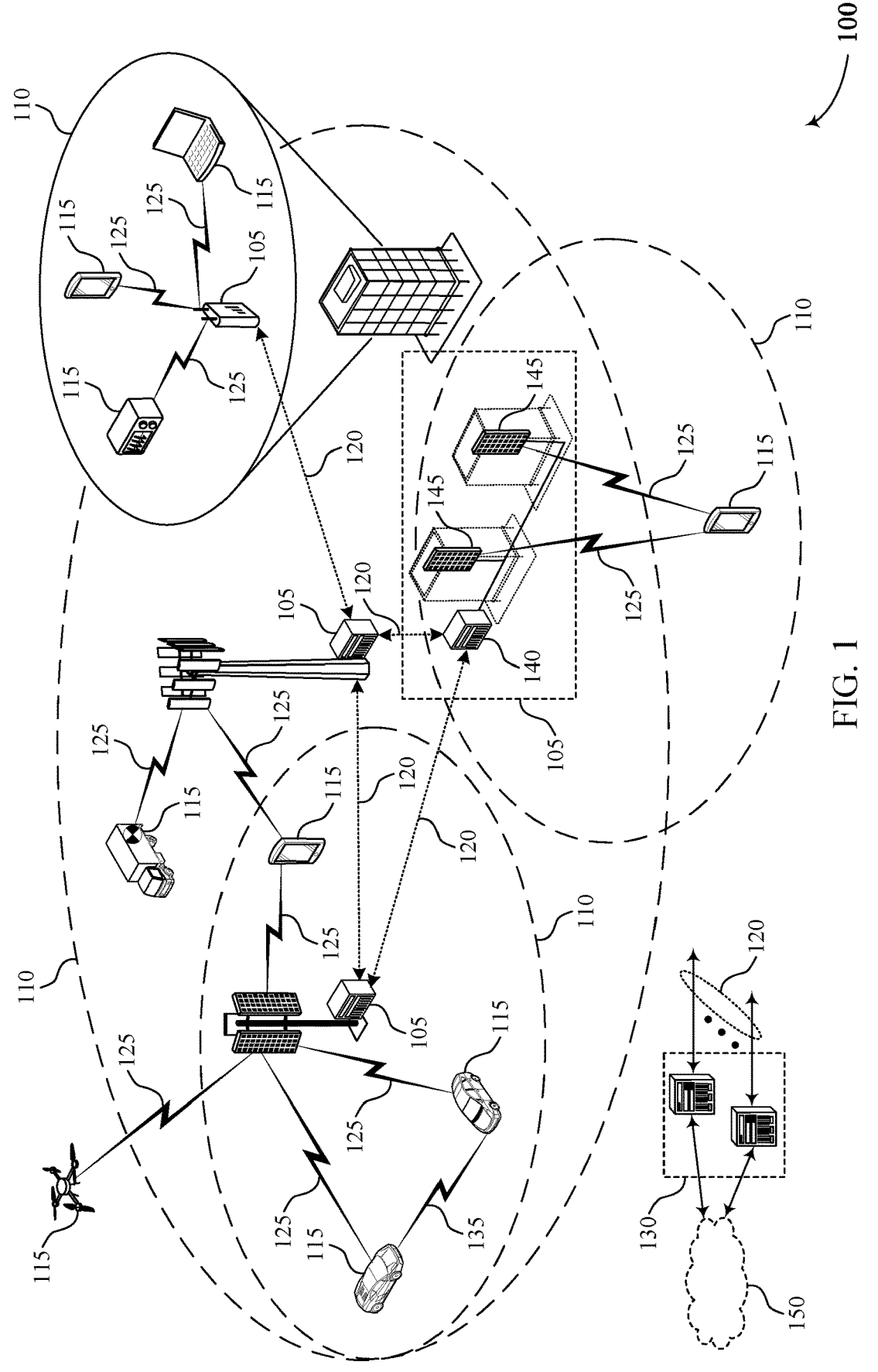
FIG. 1 illustrates an example of a wireless communications system that supports reduction of duplicate acknowl-edgments (DUP ACKs) in accordance with aspects of the present disclosure.

A user equipment (UE) or a wireless node may receive multiple transmission packets from another node, such as a base station. Each packet may be associated with a sequence number, which may indicate an order in which the packets were transmitted. In some cases, the UE may receive packets with a gap in sequence numbers, indicating that some packets were missed, and thus received out of order. The UE may hold the received packets at a given processing layer (e.g., at a packet data convergence protocol (PDCP) layer) for a duration of time. For example, the received packets may be held in a buffer with the expectation that the missing packets may be received soon.

However, when the duration of time expires, the PDCP layer will flush its buffer, sending the received packets to the transmission control protocol (TCP) layer, even if some packets are out of order. The duration of time may be based on a PDCP reorder timer expiration. The TCP layer may accept the out of order packets. The TCP layer may generate a set of duplicate acknowledgment (DUP ACK) messages, one for each out of order packet. Generally, the UE may transmit all DUP ACKs triggered by a force flush. However, this number of messages may overwhelm the uplink channel and cause inefficiencies in communications. For example, the UE may transmit scheduling requests (SRs) for each of the DUP ACKs, or for multiple sets of DUP ACKs, and the UE may receive multiple uplink grants. The transmission of the SRs by the UE, uplink grants by a base station, and DUP ACKs by the UE may thus use a substantial amount of communication resources, and cause inefficiencies and interference in communications channels.

In order to improve efficient use of communication resources, the UE may transmit fewer than the full set of DUP ACKs when packets are missed. The UE may use one of several procedures to allow the UE to transmit less than the full set of DUP ACKs. In a first case, the UE may predict a number of DUP ACKs based on the number of packets flushed from the PDCP layer to the TCP layer. The UE may select a subset of the DUP ACKs to transmit, and may drop the other DUP ACKs. The UE may also refrain from requesting an uplink grant immediately, and may instead wait until the last DUP ACK arrives at the PDCP layer and then request a grant at that time. In these cases, the UE may thus request fewer uplink grant, decreasing the amount of grants requests and granted. In another case, the UE may predict the number of DUP ACKs arriving at the PDCP layer from the TCP layer at a certain time, and may identify that, at the time of arrival, some DUP ACKs already exist in a PDCP buffer. Therefore, the UE may drop the buffered DUP ACKs and may only send a last subset of DUP ACKs. In another case, if the force flush is due to radio link control (RLC) feedback and is not due to expiration of a PDCP reordering timer, the UE may hold the buffered DUP ACKs during the duration of the RLC feedback process. If a DUP ACK is generated after the RLC feedback process, the buffered DUP ACKs may be dropped, and the UE may transmit the most recently received DUP ACK is transmitted to the network. If additional DUP ACKs are not received after the RLC feedback process, the buffered DUP ACKs may be transmitted to the network.

Thus, the UE may decrease amount of transmissions used to transmit one or more DUP ACKs for a set of transmission packets received from a base station or network node. The UE may improve efficient use of communication resources, decrease overhead, and decrease interference between communications.

Aspects of the disclosure are initially described in the context of wireless communications systems. Aspect of the disclosure are then described in the context of process flows. Aspects of the disclosure are further illustrated by and described with reference to apparatus diagrams, system diagrams, and flowcharts that relate to reduction of DUP ACKs.

FIG. 1 illustrates an example of a wireless communications system 100 that supports reduction of DUP ACKs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta$f) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless node, such as a UE 115, may receive one or more data messages which may include a set of packets that may each be associated with a sequence number of a set of sequence numbers. The UE 115 may receive the data messages from another wireless node, such as a base station 105.

The set of packets may be received with a gap in the set of sequence numbers, indicating missing packets. The wireless node may forward the set of packets to a processing layer of the wireless node. The wireless node may then accept, from the processing layer of the wireless node, a set of DUP ACK messages based on the set of packets being forwarded to the processing layer while having the gap in the set of sequence numbers. The wireless node may transmit, a subset of the set of DUP ACKs rather than all of the set of DUP ACKs to another wireless node, such as a base station 105.

Figure 2:
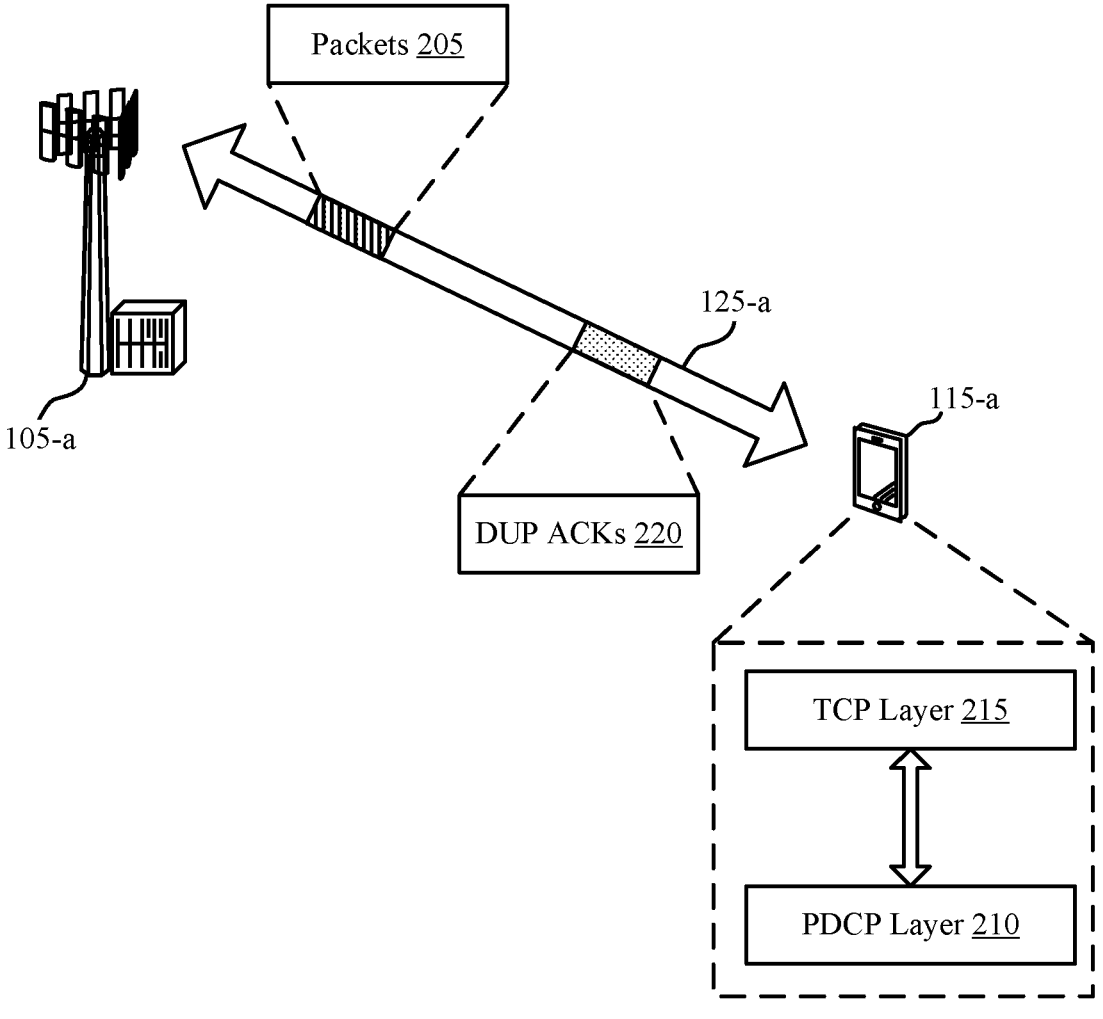
FIG. 2 illustrates an example of a wireless communications system that supports reduction of DUP ACKs in accordance with aspects of the present disclosure.

FIG. 2 illustrates an example of a wireless communications system 200 that supports reduction of DUP ACKs in accordance with aspects of the present disclosure. Wireless communications system 200 may include UE 115-a, which may be an example of a wireless node, including UEs 115 as described with respect to FIG. 1. UE 115-b may include TCP layer 215 and PDCP layer 210, along with other processing layers. TCP layer 215 and PDCP layer 210 may communicate within UE 115-a. Wireless communications system 200 may also include base station 105-a which may be an example of a network node, including base stations 105 as described herein. UE 115-a and base station 105-a may communicate over communication link 125-a.

Base station 105-a may transmit multiple packets 205 to UE 115-a. Each packet 205 may be associated with a sequence number. In some cases, UE 115-a may not receive some of packets 205. UE 115-a may determine that some packets were missed based on a gap in the sequence numbers corresponding to each of packets 205. When the packets are received, UE 115-a may hold the received packets 205 in a buffer at PDCP layer 210. UE 115-a may wait for a duration to receive the rest of packets 205. However, PDCP layer 210 may flush the contents of the buffer, including the buffered packets 205, after a time duration. The time duration may be based on a PDCP reorder timer expiration.

PDCP layer 210 may flush the contents of the buffer to the TCP layer 215. TCP layer 215 may accept the out of order packets 205, and may generate a set of DUP ACKs 220 for each out of order packet. In order to transmit each of the DUP ACKs 220, UE 115-a may transmit multiple SRs to base station 105-a requesting uplink grants. Base station 105-a may then transmit multiple uplink grants to UE 115-a, which UE 115-a may use to transmit each DUP ACK 220. This process thus requires substantial communications resources, which may be inefficient.

Rather, UE 115-a may perform processes to transmit a decreased number of DUP ACKs 220 in order to improve efficient use of communication resources. In a first case, UE 115-a may predict a number of DUP ACKs 220 based on the number of packets 205 flushed from PDCP layer 210 to TCP layer 215. UE 115-a may select a subset of the DUP ACKs 220 to transmit, and may drop the other DUP ACKs 220. The UE may also refrain from requesting an uplink grant immediately, and may instead wait until the last DUP ACK 220 arrives at the PDCP layer 210, and then UE 115-a may request an uplink grant at that time.

In another case, UE 115-a may predict the number of DUP ACKs 220 arriving at the PDCP layer 210 from the TCP layer 215 at a certain time. UE 115-a may then identify that, at the time of arrival, some DUP ACKs already exist in a PDCP layer 210 buffer. Therefore, the UE may drop the buffered DUP ACKs 220 and may only send a last subset of DUP ACKs 220.

In another case, if the force flush from PDCP layer 210 to TCP layer 215 is due to RLC feedback (e.g., a HARQ process) and is not due to expiration of a PDCP layer 210 reordering timer, UE 115-a may hold the buffered DUP ACKs 220 during the duration of the RLC feedback process. If a DUP ACK 220 is generated after the RLC feedback process, the buffered DUP ACKs 220 may be dropped, and the most recently received DUP ACK 220 is transmitted to the network. In these cases, UE 115-a may transmit a single DUP ACK 220 to base station 105-a. If additional DUP ACKs 220 are not received after the RLC feedback process, the buffered DUP ACKs 220 may be transmitted to the network.

UE 115-a may thus decrease the number of DUP ACKs 220 transmitted to base station 105-a, which may thereby decrease other communications overhead, including SRs, uplink grants, and further transmission of DUP ACKs 220. UE 115-a may therefore improve communications efficiency between UE 115-a and base station 105-a.

Figure 3:
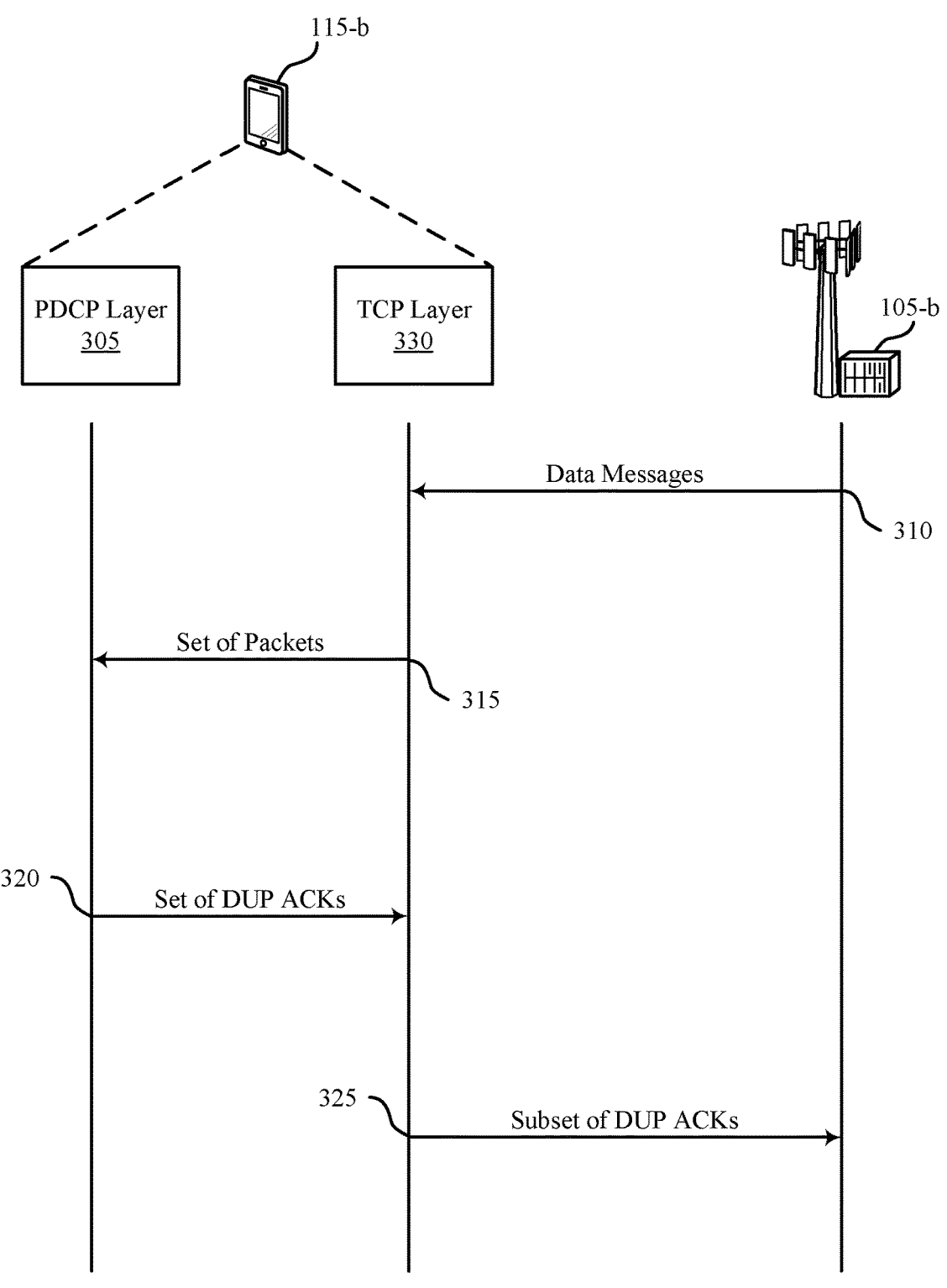
FIG. 3 illustrates an example of a process flow that supports reduction of DUP ACKs in accordance with aspects of the present disclosure.

FIG. 3 illustrates an example of a process flow 300 that supports reduction of DUP ACKs in accordance with aspects of the present disclosure. Process flow 300 may include UE 115-b, which may be an example of a UE 115 as described with respect to FIGS. 1 and 2. UE 115-b may be an example of a wireless node. UE 115-b may include a PDCP layer 305, which may be an example of a processing layer with which UE 115-b may communicate internally. UE 115—may also include a TCP layer 330. TCP layer 330 may communicate internally to UE 115-a with PDCP layer 305. Process flow 300 also may include base station 105-b, which may be an example of a base station 105 as described with respect to FIGS. 1 and 2. Base station 105-b may be an example of a base station 105 or another communication device, including another wireless node or network device.

At 310, UE 115-b may receive one or more data messages. The one or more data message may include a set of packets that are each associated with a sequence number of a set of sequence numbers. UE 115-b may receive the set of packets with a gap in sequence numbers, such that the sequence numbers may not be in consecutive order. UE 115-b may receive the one or more data messages from base station 105-b.

At 315, UE 115-b (e.g., via TCP layer 330) may forward the set of packets to a PDCP layer 305 (e.g., a processing layer) of UE 115-b. In some cases, the forwarding may be based on expiration of a PDCP reorder timer expiry.

In other cases, the forwarding may be based on an RLC ARQ and not on an expiration of a PDCP reorder timer expiry. In these cases, UE 115-b (e.g., at PDCP layer 305) may maintain one or more of the set of DUP ACKs in a buffer. UE 115-b may also accept an additional DUP ACK at 320, after expiration of the PDCP reorder timer.

At 320, UE 115-b (e.g., at TCP layer 330) may accept, from the PDCP layer 305, a set of DUP ACK messages based on the set of packets being forwarded to the PDCP layer 305 at 315, while having the gap in the set of sequence numbers.

In some cases, UE 115-b may predict a number of DUP ACK messages to be generated. UE 115-b may identify a last DUP ACK message to be accepted based on the predicting. UE 115-b may then refrain from requesting an uplink grant for retransmission of the one or more data messages until after the last DUP ACK is accepted.

At 325, UE 115-b may transmit, via a first subset of the set of DUP ACK messages, less than all of the set of DUP ACK messages.

In some cases, UE 115-b may identify the first subset of the set of DUP ACK messages based on a number of DUP ACK messages within the set of DUP ACK messages.

In some cases, UE 115-b may drop DUP ACK messages that are members of the set of DUP ACK messages, but that are outside of the subset of DUP ACK messages. The dropped messages may not then be a part of the transmitted subset at 325.

In some cases, UE 115-*b* may identify that a buffer (e.g., at PDCP layer 305) includes one or more DUP ACK messages accepted for packets of the set of packets received in sequence. UE 115-*b* may then drop at least the one or more DUP ACK messages in the buffer. Then, the subset of the set of DUP ACK messages that is transmitted may include at least a last accepted one or more DUP ACK messages of the set of DUP ACK messages.

In cases where UE 115-*b* accepts one or more additional DUP ACKs, the additional DUP ACK message may be added to the set of DUP ACK messages. UE 115-*b* may then drop the one or more of the set of DUP ACK messages in the buffer. UE 115-*b* may also transmit the additional DUP ACK message as the subset of DUP ACK messages. UE 115-*b* may also transmit the or more of the set of DUP ACK messages that are in the buffer as the subset of DUP ACK messages transmitted at 325.

Figure 4:
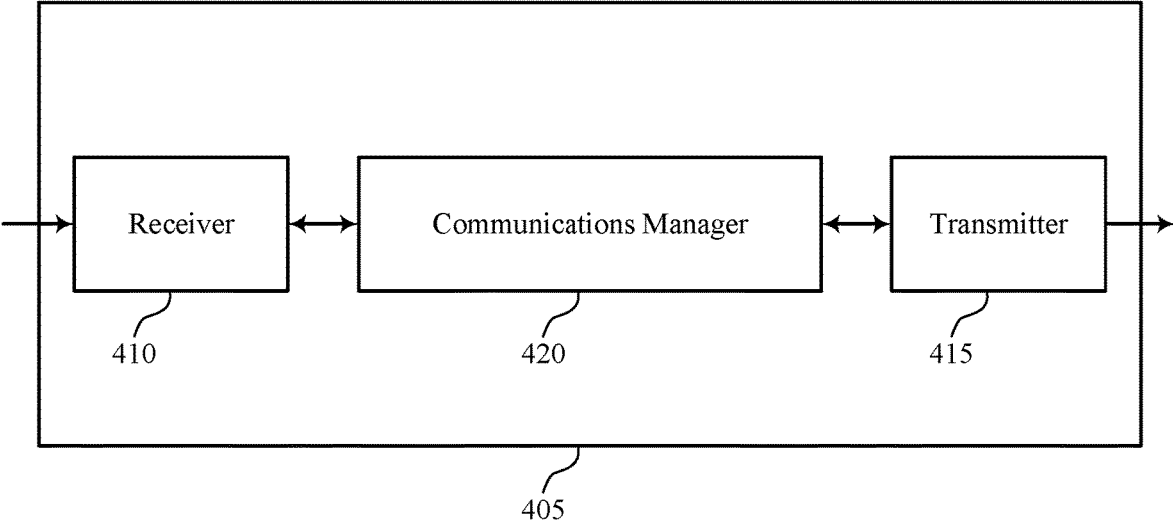
FIGS. 4 and 5 show block diagrams of devices that support reduction of DUP ACKs in accordance with aspects of the present disclosure.

FIG. 4 shows a block diagram 400 of a device 405 that supports reduction of DUP ACKs in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to reduction of DUP ACKs). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to reduction of DUP ACKs). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of reduction of DUP ACKs as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a wireless node in accordance with examples as disclosed herein. For example, the communications manager 420 may be configured as or otherwise support a means for receiving one or more data messages at the wireless node, the one or more data messages including a set of multiple packets that are each associated with a sequence number of a set of sequence numbers, the set of multiple packets received with a gap in the set of sequence numbers. The communications manager 420 may be configured as or otherwise support a means for forwarding the set of multiple packets to a processing layer of the wireless node. The communications manager 420 may be configured as or otherwise support a means for accepting, from the processing layer of the wireless node, a set of DUP ACK messages based on the set of multiple packets being forwarded to the processing layer while having the gap in the set of sequence numbers. The communications manager 420 may be configured as or otherwise support a means for transmitting, via a first subset of the set of DUP ACK messages, less than all of the set of DUP ACK messages.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
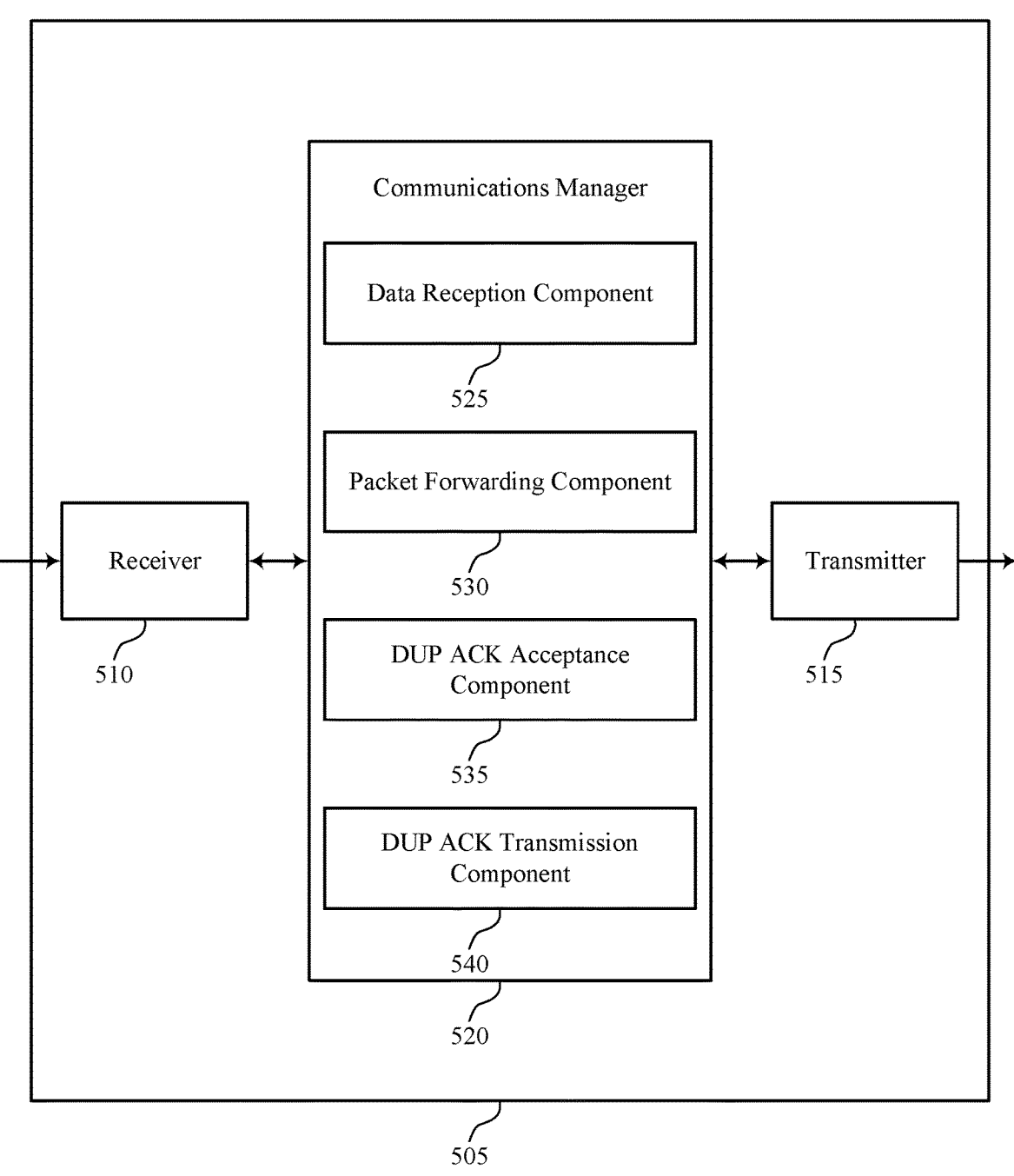

FIG. 5 shows a block diagram 500 of a device 505 that supports reduction of DUP ACKs in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reduction of DUP ACKs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reduction of DUP ACKs). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of reduction of DUP ACKs as described herein. For example, the communications manager 520 may include a data reception component 525, a packet forwarding component 530, a DUP ACK acceptance component 535, a DUP ACK transmission component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a wireless node in accordance with examples as disclosed herein. The data reception component 525 may be configured as or otherwise support a means for receiving one or more data messages at the wireless node, the one or more data messages including a set of multiple packets that are each associated with a sequence number of a set of sequence numbers, the set of multiple packets received with a gap in the set of sequence numbers. The packet forwarding component 530 may be configured as or otherwise support a means for forwarding the set of multiple packets to a processing layer of the wireless node. The DUP ACK acceptance component 535 may be configured as or otherwise support a means for accepting, from the processing layer of the wireless node, a set of DUP ACK messages based on the set of multiple packets being forwarded to the processing layer while having the gap in the set of sequence numbers. The DUP ACK transmission component 540 may be configured as or otherwise support a means for transmitting, via a first subset of the set of DUP ACK messages, less than all of the set of DUP ACK messages.

Figure 6:
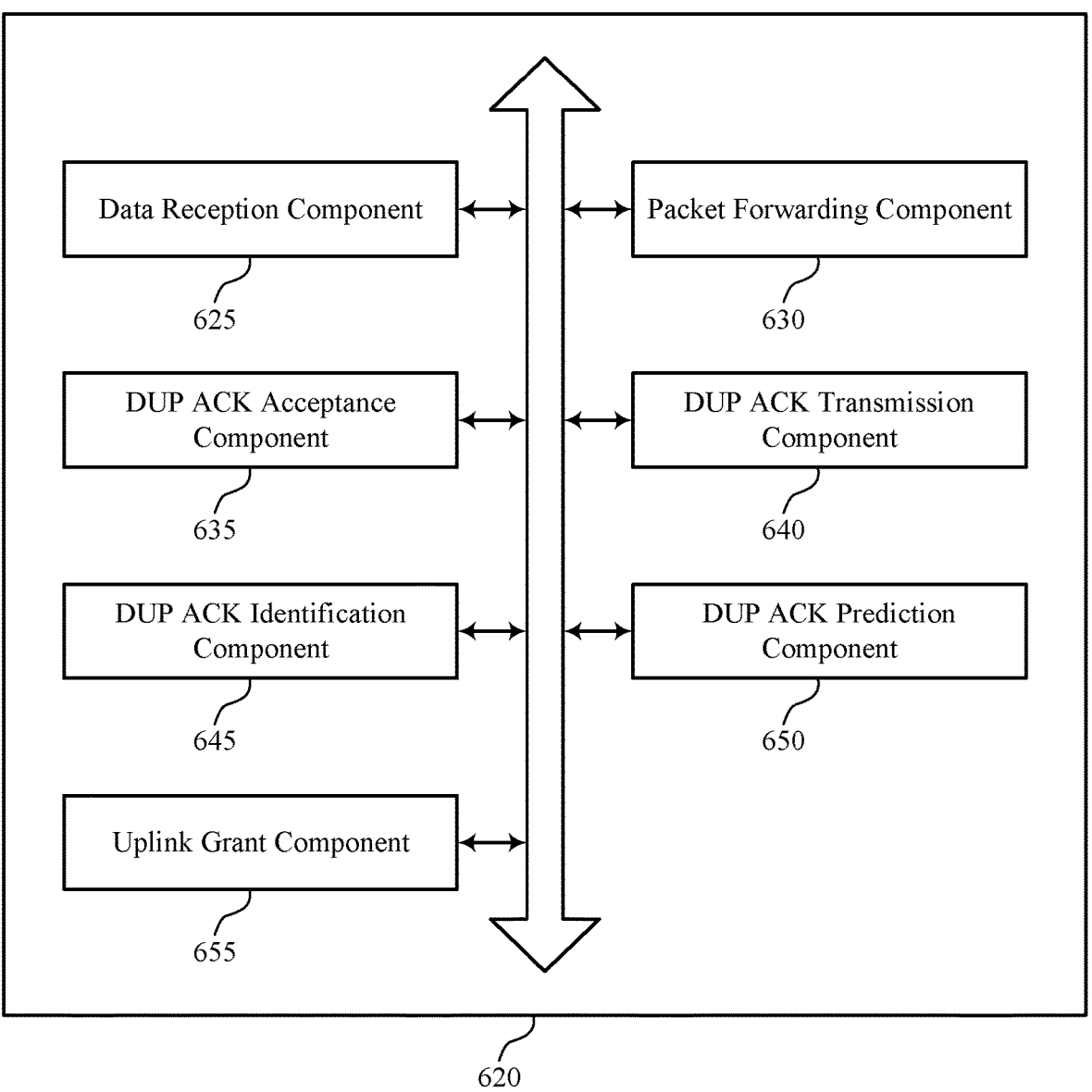
FIG. 6 shows a block diagram of a communications manager that supports reduction of DUP ACKs in accordance with aspects of the present disclosure.

FIG. 6 shows a block diagram 600 of a communications manager 620 that supports reduction of DUP ACKs in accordance with aspects of the present disclosure. The communications manager 620 may be an example of aspects of a communications manager 420, a communications manager 520, or both, as described herein. The communications manager 620, or various components thereof, may be an example of means for performing various aspects of reduction of DUP ACKs as described herein. For example, the communications manager 620 may include a data reception component 625, a packet forwarding component 630, a DUP ACK acceptance component 635, a DUP ACK transmission component 640, a DUP ACK identification component 645, a DUP ACK prediction component 650, an uplink grant component 655, or any combination thereof. Each of these components may communicate, directly or indirectly, with one another (e.g., via one or more buses).

The communications manager 620 may support wireless communications at a wireless node in accordance with examples as disclosed herein. The data reception component 625 may be configured as or otherwise support a means for receiving one or more data messages at the wireless node, the one or more data messages including a set of multiple packets that are each associated with a sequence number of a set of sequence numbers, the set of multiple packets received with a gap in the set of sequence numbers. The packet forwarding component 630 may be configured as or otherwise support a means for forwarding the set of multiple packets to a processing layer of the wireless node. The DUP ACK acceptance component 635 may be configured as or otherwise support a means for accepting, from the processing layer of the wireless node, a set of DUP ACK messages based on the set of multiple packets being forwarded to the processing layer while having the gap in the set of sequence numbers. The DUP ACK transmission component 640 may be configured as or otherwise support a means for transmitting, via a first subset of the set of DUP ACK messages, less than all of the set of DUP ACK messages.

In some examples, the DUP ACK identification component 645 may be configured as or otherwise support a means for identifying the first subset of the set of DUP ACK messages based on a number of DUP ACK messages within the set of DUP ACK messages.

In some examples, the DUP ACK prediction component 650 may be configured as or otherwise support a means for predicting a number of DUP ACK messages to be generated. In some examples, the DUP ACK identification component 645 may be configured as or otherwise support a means for identifying a last DUP ACK message to be accepted based on the predicting. In some examples, the uplink grant component 655 may be configured as or otherwise support a means for refraining from requesting an uplink grant for retransmission of the one or more data messages until after the last DUP ACK message is accepted.

In some examples, the DUP ACK transmission component 640 may be configured as or otherwise support a means for dropping DUP ACK messages that are members of the set of DUP ACK messages but that are outside of the subset of DUP ACK messages.

In some examples, the DUP ACK identification component 645 may be configured as or otherwise support a means for identifying that a buffer includes one or more DUP ACK messages accepted for packets of the set of multiple packets received in sequence. In some examples, the DUP ACK transmission component 640 may be configured as or otherwise support a means for dropping at least the one or more DUP ACK messages in the buffer, where the subset of the set of DUP ACK messages that is transmitted includes at least a last-accepted one or more DUP ACK messages of the set of DUP ACK messages.

In some examples, forwarding the set of multiple packets to the processing layer of the wireless node is based on expiration of a packet data convergence protocol (PDCP) reorder timer expiry.

In some examples, forwarding the set of multiple packets to the processing layer of the wireless node is based on RLC ARQ and not on expiration of a PDCP reorder timer expiry.

In some examples, the DUP ACK transmission component 640 may be configured as or otherwise support a means for maintaining one or more of the set of DUP ACK messages in a buffer while ARQ-recovered PDCP packets are forwarded to the processing layer.

In some examples, the DUP ACK acceptance component 635 may be configured as or otherwise support a means for accepting an additional DUP ACK message after expiration of the PDCP reorder timer, the additional DUP ACK message being added to the set of DUP ACK messages. In some examples, the DUP ACK transmission component 640 may be configured as or otherwise support a means for dropping the one or more of the set of DUP ACK messages in the buffer. In some examples, the DUP ACK transmission component 640 may be configured as or otherwise support a means for transmitting the additional DUP ACK message as the subset of DUP ACK messages.

In some examples, to support transmitting the first subset of the set of DUP ACK messages, the DUP ACK transmission component 640 may be configured as or otherwise support a means for transmitting the one or more of the set of DUP ACK messages that are in the buffer as the subset of DUP ACK messages.

Figure 7:
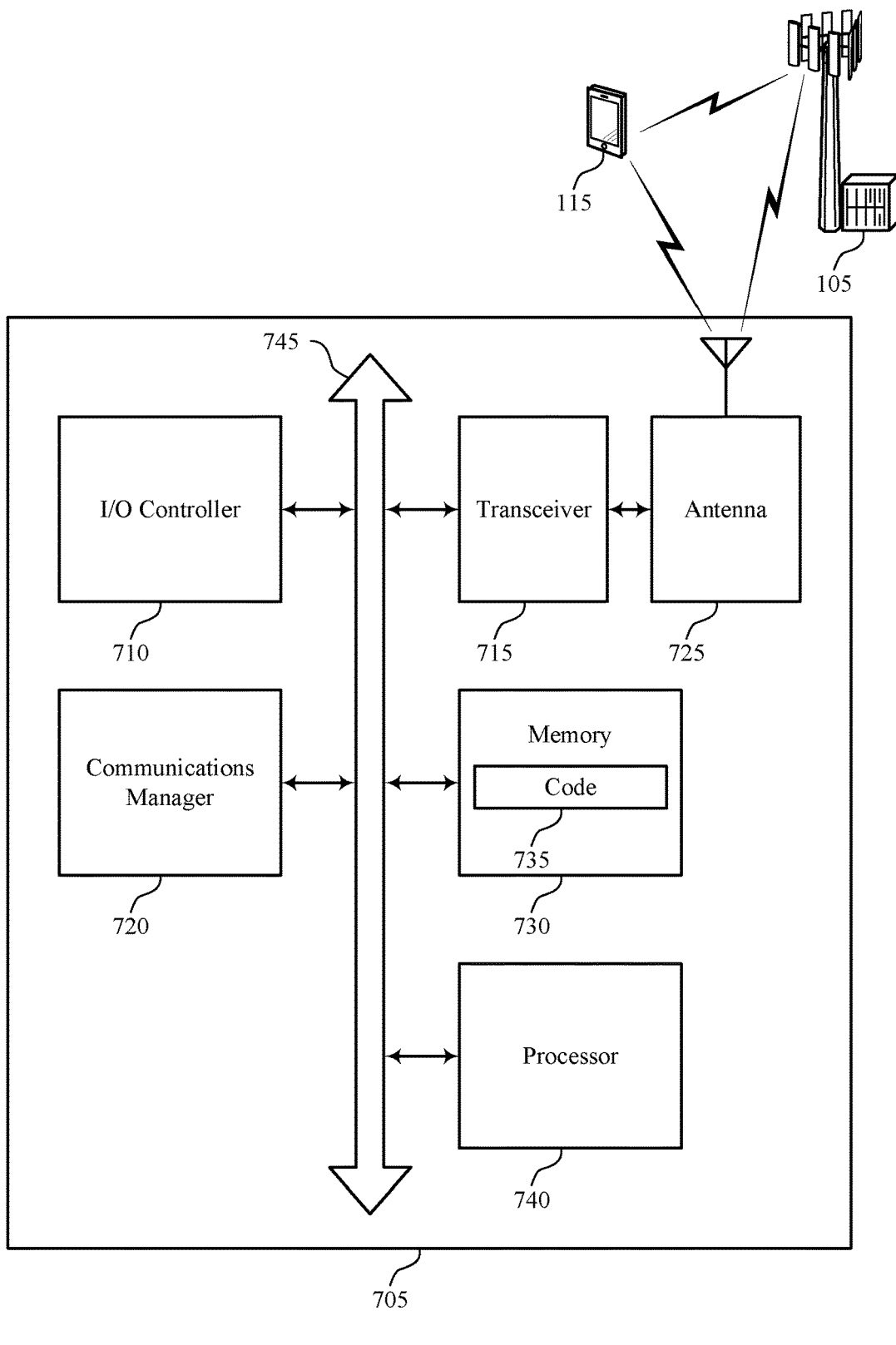
FIG. 7 shows a diagram of a system including a device that supports reduction of DUP ACKs in accordance with aspects of the present disclosure.

FIG. 7 shows a diagram of a system 700 including a device 705 that supports reduction of DUP ACKs in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into processor 740. The processor 740 may be configured to execute computer-readable instructions stored in a memory (e.g., the memory 730) to cause the device 705 to perform various functions (e.g., functions or tasks supporting reduction of DUP ACKs). For example, the device 705 or a component of the device 705 may include a processor 740 and memory 730 coupled to the processor 740, the processor 740 and memory 730 configured to perform various functions described herein.

The communications manager 720 may support wireless communications at a wireless node in accordance with examples as disclosed herein. For example, the communications manager 720 may be configured as or otherwise support a means for receiving one or more data messages at the wireless node, the one or more data messages including a set of multiple packets that are each associated with a sequence number of a set of sequence numbers, the set of multiple packets received with a gap in the set of sequence numbers. The communications manager 720 may be configured as or otherwise support a means for forwarding the set of multiple packets to a processing layer of the wireless node. The communications manager 720 may be configured as or otherwise support a means for accepting, from the processing layer of the wireless node, a set of DUP ACK messages based on the set of multiple packets being forwarded to the processing layer while having the gap in the set of sequence numbers. The communications manager 720 may be configured as or otherwise support a means for transmitting, via a first subset of the set of DUP ACK messages, less than all of the set of DUP ACK messages.

By including or configuring the communications manager 720 in accordance with examples as described herein, the device 705 may support techniques for reduced power consumption, more efficient utilization of communication resources, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of reduction of DUP ACKs as described herein, or the processor 740 and the memory 730 may be otherwise configured to perform or support such operations.

FIG. 8 shows a flowchart illustrating a method 800 that supports reduction of DUP ACKs in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include receiving one or more data messages at the wireless node, the one or more data messages including a set of multiple packets that are each associated with a sequence number of a set of sequence numbers, the set of multiple packets received with a gap in the set of sequence numbers. The operations of 805 may be performed in accordance with examples as disclosed herein. In some examples, aspects of the operations of 805 may be performed by a data reception component 625 as described with reference to FIG. 6.

At 810, the method may include forwarding the set of multiple packets to a processing layer of the wireless node. The operations of 810 may be performed in accordance with examples as disclosed herein. In some examples, aspects of the operations of 810 may be performed by a packet forwarding component 630 as described with reference to FIG. 6.

At 815, the method may include accepting, from the processing layer of the wireless node, a set of DUP ACK messages based on the set of multiple packets being forwarded to the processing layer while having the gap in the set of sequence numbers. The operations of 815 may be performed in accordance with examples as disclosed herein. In some examples, aspects of the operations of 815 may be performed by a DUP ACK acceptance component 635 as described with reference to FIG. 6.

At 820, the method may include transmitting, via a first subset of the set of DUP ACK messages, less than all of the set of DUP ACK messages. The operations of 820 may be performed in accordance with examples as disclosed herein. In some examples, aspects of the operations of 820 may be performed by a DUP ACK transmission component 640 as described with reference to FIG. 6.

Figure 9:
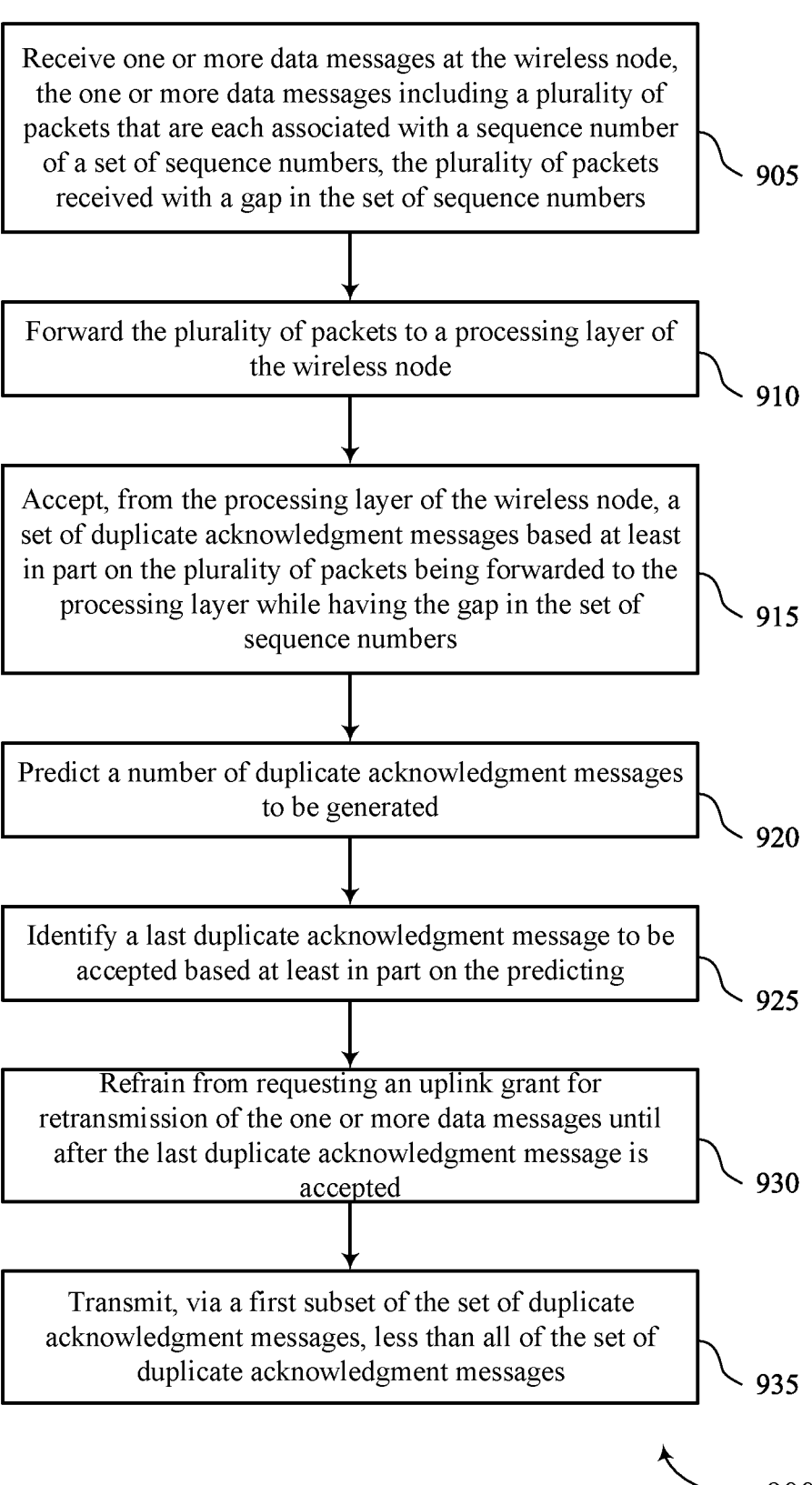

FIG. 9 shows a flowchart illustrating a method 900 that supports reduction of DUP ACK in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include receiving one or more data messages at the wireless node, the one or more data messages including a set of multiple packets that are each associated with a sequence number of a set of sequence numbers, the set of multiple packets received with a gap in the set of sequence numbers. The operations of 905 may be performed in accordance with examples as disclosed herein. In some examples, aspects of the operations of 905 may be performed by a data reception component 625 as described with reference to FIG. 6.

At 910, the method may include forwarding the set of multiple packets to a processing layer of the wireless node. The operations of 910 may be performed in accordance with examples as disclosed herein. In some examples, aspects of the operations of 910 may be performed by a packet forwarding component 630 as described with reference to FIG. 6.

At 915, the method may include accepting, from the processing layer of the wireless node, a set of DUP ACK messages based on the set of multiple packets being forwarded to the processing layer while having the gap in the set of sequence numbers. The operations of 915 may be performed in accordance with examples as disclosed herein. In some examples, aspects of the operations of 915 may be performed by a DUP ACK acceptance component 635 as described with reference to FIG. 6.

At 920, the method may include predicting a number of DUP ACK messages to be generated. The operations of 920 may be performed in accordance with examples as disclosed herein. In some examples, aspects of the operations of 920 may be performed by a DUP ACK prediction component 650 as described with reference to FIG. 6.

At 925, the method may include identifying a last DUP ACK message to be accepted based on the predicting. The operations of 925 may be performed in accordance with examples as disclosed herein. In some examples, aspects of the operations of 925 may be performed by a DUP ACK identification component 645 as described with reference to FIG. 6.

At 930, the method may include refraining from requesting an uplink grant for retransmission of the one or more data messages until after the last DUP ACK message is accepted. The operations of 930 may be performed in accordance with examples as disclosed herein. In some examples, aspects of the operations of 930 may be performed by an uplink grant component 655 as described with reference to FIG. 6.

At 935, the method may include transmitting, via a first subset of the set of DUP ACK messages, less than all of the set of DUP ACK messages. The operations of 935 may be performed in accordance with examples as disclosed herein. In some examples, aspects of the operations of 935 may be performed by a DUP ACK transmission component 640 as described with reference to FIG. 6.

FIG. 10 shows a flowchart illustrating a method 1000 that supports reduction of DUP ACKs in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include receiving one or more data messages at the wireless node, the one or more data messages including a set of multiple packets that are each associated with a sequence number of a set of sequence numbers, the set of multiple packets received with a gap in the set of sequence numbers. The operations of 1005 may be performed in accordance with examples as disclosed herein. In some examples, aspects of the operations of 1005 may be performed by a data reception component 625 as described with reference to FIG. 6.

At 1010, the method may include forwarding the set of multiple packets to a processing layer of the wireless node. The operations of 1010 may be performed in accordance with examples as disclosed herein. In some examples, aspects of the operations of 1010 may be performed by a packet forwarding component 630 as described with reference to FIG. 6.

At 1015, the method may include accepting, from the processing layer of the wireless node, a set of DUP ACK messages based on the set of multiple packets being forwarded to the processing layer while having the gap in the set of sequence numbers. The operations of 1015 may be performed in accordance with examples as disclosed herein. In some examples, aspects of the operations of 1015 may be performed by a DUP ACK acceptance component 635 as described with reference to FIG. 6.

At 1020, the method may include dropping DUP ACK messages that are members of the set of DUP ACK messages but that are outside of the subset of DUP ACK messages. The operations of 1020 may be performed in accordance with examples as disclosed herein. In some examples, aspects of the operations of 1020 may be performed by a DUP ACK transmission component 640 as described with reference to FIG. 6.

At 1025, the method may include transmitting, via a first subset of the set of DUP ACK messages, less than all of the set of DUP ACK messages. The operations of 1025 may be performed in accordance with examples as disclosed herein. In some examples, aspects of the operations of 1025 may be performed by a DUP ACK transmission component 640 as described with reference to FIG. 6.

FIG. 11 shows a flowchart illustrating a method 1100 that supports reduction of DUP ACKs in accordance with aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1105, the method may include receiving one or more data messages at the wireless node, the one or more data messages including a set of multiple packets that are each associated with a sequence number of a set of sequence numbers, the set of multiple packets received with a gap in the set of sequence numbers. The operations of 1105 may be performed in accordance with examples as disclosed herein. In some examples, aspects of the operations of 1105 may be performed by a data reception component 625 as described with reference to FIG. 6.

At 1110, the method may include forwarding the set of multiple packets to a processing layer of the wireless node. The operations of 1110 may be performed in accordance with examples as disclosed herein. In some examples, aspects of the operations of 1110 may be performed by a packet forwarding component 630 as described with reference to FIG. 6.

At 1115, the method may include accepting, from the processing layer of the wireless node, a set of DUP ACK messages based on the set of multiple packets being forwarded to the processing layer while having the gap in the set of sequence numbers. The operations of 1115 may be performed in accordance with examples as disclosed herein. In some examples, aspects of the operations of 1115 may be performed by a DUP ACK acceptance component 635 as described with reference to FIG. 6.

At 1120, the method may include identifying that a buffer includes one or more DUP ACK messages accepted for packets of the set of multiple packets received in sequence. The operations of 1120 may be performed in accordance with examples as disclosed herein. In some examples, aspects of the operations of 1120 may be performed by a DUP ACK identification component 645 as described with reference to FIG. 6.

At 1125, the method may include dropping at least the one or more DUP ACK messages in the buffer, where the subset of the set of DUP ACK messages that is transmitted includes at least a last-accepted one or more DUP ACK messages of the set of DUP ACK messages. The operations of 1125 may be performed in accordance with examples as disclosed herein. In some examples, aspects of the operations of 1125 may be performed by a DUP ACK transmission component 640 as described with reference to FIG. 6.

At 1130, the method may include transmitting, via a first subset of the set of DUP ACK messages, less than all of the set of DUP ACK messages. The operations of 1130 may be performed in accordance with examples as disclosed herein. In some examples, aspects of the operations of 1130 may be performed by a DUP ACK transmission component 640 as described with reference to FIG. 6.

The following provides an overview of aspects of the present disclosure:

Aspect 1: A method for wireless communications at a wireless node, comprising: receiving one or more data messages at the wireless node, the one or more data messages including a plurality of packets that are each associated with a sequence number of a set of sequence numbers, the plurality of packets received with a gap in the set of sequence numbers; forwarding the plurality of packets to a processing layer of the wireless node; accepting, from the processing layer of the wireless node, a set of DUP ACK messages based at least in part on the plurality of packets being forwarded to the processing layer while having the gap in the set of sequence numbers; and transmitting, via a first subset of the set of DUP ACK messages, less than all of the set of DUP ACK messages.

Aspect 2: The method of aspect 1, further comprising: identifying the first subset of the set of DUP ACK messages based on a number of DUP ACK messages within the set of DUP ACK messages.

Aspect 3: The method of any of aspects 1 through 2, further comprising: predicting a number of DUP ACK messages to be generated; identifying a last DUP ACK message to be accepted based at least in part on the predicting; and refraining from requesting an uplink grant for retransmission of the one or more data messages until after the last DUP ACK message is accepted.

Aspect 4: The method of any of aspects 1 through 3, further comprising: dropping DUP ACK messages that are members of the set of DUP ACK messages but that are outside of the subset of DUP ACK messages.

Aspect 5: The method of any of aspects 1 through 4, further comprising: identifying that a buffer includes one or more DUP ACK messages accepted for packets of the plurality of packets received in sequence; dropping at least the one or more DUP ACK messages in the buffer, wherein the subset of the set of DUP ACK messages that is transmitted includes at least a last-accepted one or more DUP ACK messages of the set of DUP ACK messages.

Aspect 6: The method of any of aspects 1 through 5, wherein forwarding the plurality of packets to the processing layer of the wireless node is based at least in part on expiration of a packet data convergence protocol (PDCP) reorder timer expiry.

Aspect 7: The method of any of aspects 1 through 6, wherein forwarding the plurality of packets to the processing layer of the wireless node is based at least in part on RLC automatic repeat request (ARQ) and not on expiration of a packet data convergence protocol (PDCP) reorder timer expiry.

Aspect 8: The method of aspect 7, further comprising: maintaining one or more of the set of DUP ACK messages in a buffer while ARQ-recovered PDCP packets are forwarded to the processing layer.

Aspect 9: The method of aspect 8, further comprising: accepting an additional DUP ACK message after expiration of the PDCP reorder timer, the additional DUP ACK message being added to the set of DUP ACK messages; dropping the one or more of the set of DUP ACK messages in the buffer; and transmitting the additional DUP ACK message as the subset of DUP ACK messages.

Aspect 10: The method of any of aspects 8 through 9, wherein transmitting the first subset of the set of DUP ACK messages comprises: transmitting the one or more of the set of DUP ACK messages that are in the buffer as the subset of DUP ACK messages.

Aspect 11: An apparatus for wireless communications at a wireless node, comprising a processor; memory coupled with the processor; and instructions stored in the memory and executable by the processor to cause the apparatus to perform a method of any of aspects 1 through 10.

Aspect 12: An apparatus for wireless communications at a wireless node, comprising at least one means for performing a method of any of aspects 1 through 10.

Aspect 13: A non-transitory computer-readable medium storing code for wireless communications at a wireless node, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a wireless node, comprising:
  receiving one or more data messages at the wireless node, the one or more data messages including a plurality of packets that are each associated with a sequence number of a set of sequence numbers, the plurality of packets received with a gap in the set of sequence numbers;
  forwarding the plurality of packets to a processing layer of the wireless node;
  accepting, from the processing layer of the wireless node, a set of duplicate acknowledgment messages based at least in part on the plurality of packets being forwarded to the processing layer while having the gap in the set of sequence numbers;

identifying a first subset of the set of duplicate acknowledgment messages based on a first number of duplicate acknowledgment messages within the set of duplicate acknowledgment messages; and
  transmitting, via the first subset of the set of duplicate acknowledgment messages, less than all of the set of duplicate acknowledgment messages.

2. The method of claim 1, further comprising:
predicting a second number of duplicate acknowledgment messages to be generated;
identifying a last duplicate acknowledgment message to be accepted based at least in part on the predicting; and
refraining from requesting an uplink grant for retransmission of the one or more data messages until after the last duplicate acknowledgment message is accepted.

3. The method of claim 1, further comprising:
dropping duplicate acknowledgment messages that are members of the set of duplicate acknowledgment messages but that are outside of the first subset of the set of duplicate acknowledgment messages.

4. The method of claim 1, further comprising:
identifying that a buffer includes one or more duplicate acknowledgment messages accepted for packets of the plurality of packets received in sequence; and
dropping at least the one or more duplicate acknowledgment messages in the buffer, wherein the first subset of the set of duplicate acknowledgment messages that is transmitted includes at least a last-accepted one or more duplicate acknowledgment messages of the set of duplicate acknowledgment messages.

5. The method of claim 1, wherein forwarding the plurality of packets to the processing layer of the wireless node is based at least in part on expiration of a packet data convergence protocol (PDCP) reorder timer expiry.

6. The method of claim 1, wherein forwarding the plurality of packets to the processing layer of the wireless node is based at least in part on radio link control (RLC) automatic repeat request (ARQ) and not on expiration of a packet data convergence protocol (PDCP) reorder timer expiry.

7. The method of claim 6, further comprising:
maintaining one or more duplicate acknowledgment messages of the set of duplicate acknowledgment messages in a buffer while ARQ-recovered PDCP packets are forwarded to the processing layer.

8. The method of claim 7, further comprising:
accepting an additional duplicate acknowledgment message after expiration of the PDCP reorder timer, the additional duplicate acknowledgment message being added to the set of duplicate acknowledgment messages;
dropping the one or more duplicate acknowledgment messages of the set of duplicate acknowledgment messages in the buffer; and
transmitting the additional duplicate acknowledgment message as the first subset of the set of duplicate acknowledgment messages.

9. The method of claim 7, wherein transmitting the first subset of the set of duplicate acknowledgment messages comprises:
transmitting the one or more duplicate acknowledgment messages of the set of duplicate acknowledgment messages that are in the buffer as the first subset of the set of duplicate acknowledgment messages.

10. An apparatus for wireless communications at a wireless node, comprising:

one or more processors; and one or more memories coupled with the one or more processors, the one or more memories storing instructions executable by the one or more processors to cause the apparatus to:

receive one or more data messages at the wireless node, the one or more data messages including a plurality of packets that are each associated with a sequence number of a set of sequence numbers, the plurality of packets received with a gap in the set of sequence numbers;

forward the plurality of packets to a processing layer of the wireless node;

accept, from the processing layer of the wireless node, a set of duplicate acknowledgment messages based at least in part on the plurality of packets being forwarded to the processing layer while having the gap in the set of sequence numbers;

identify a first subset of the set of duplicate acknowledgment messages based on a number of duplicate acknowledgment messages within the set of duplicate acknowledgment messages; and transmit, via the first subset of the set of duplicate acknowledgment messages, less than all of the set of duplicate acknowledgment messages.

11. The apparatus of claim 10, wherein the instructions are further executable by the one or more processors to cause the apparatus to:

predict a second number of duplicate acknowledgment messages to be generated;

identify a last duplicate acknowledgment message to be accepted based at least in part on the predicting; and refrain from requesting an uplink grant for retransmission of the one or more data messages until after the last duplicate acknowledgment message is accepted.

12. The apparatus of claim 10, wherein the instructions are further executable by the one or more processors to cause the apparatus to:

dropping duplicate acknowledgment messages that be members of the set of duplicate acknowledgment messages but that are outside of the first subset of the set of duplicate acknowledgment messages.

13. The apparatus of claim 10, wherein the instructions are further executable by the one or more processors to cause the apparatus to:

identify that a buffer includes one or more duplicate acknowledgment messages accepted for packets of the plurality of packets received in sequence; and drop at least the one or more duplicate acknowledgment messages in the buffer, wherein the first subset of the set of duplicate acknowledgment messages that is transmitted includes at least a last-accepted one or more duplicate acknowledgment messages of the set of duplicate acknowledgment messages.

14. The apparatus of claim 10, wherein forwarding the plurality of packets to the processing layer of the wireless node is based at least in part on expiration of a packet data convergence protocol (PDCP) reorder timer expiry.

15. The apparatus of claim 10, wherein forwarding the plurality of packets to the processing layer of the wireless node is based at least in part on radio link control (RLC) automatic repeat request (ARQ) and not on expiration of a packet data convergence protocol (PDCP) reorder timer expiry.

16. The apparatus of claim 15, wherein the instructions are further executable by the one or more processors to cause the apparatus to:

maintain one or more duplicate acknowledgment messages of the set of duplicate acknowledgment messages in a buffer while ARQ-recovered PDCP packets are forwarded to the processing layer.

17. The apparatus of claim 16, wherein the instructions are further executable by the one or more processors to cause the apparatus to:

accept an additional duplicate acknowledgment message after expiration of the PDCP reorder timer, the additional duplicate acknowledgment message being added to the set of duplicate acknowledgment messages;

drop the one or more duplicate acknowledgment messages of the set of duplicate acknowledgment messages in the buffer; and transmit the additional duplicate acknowledgment message as the first subset of the set of duplicate acknowledgment messages.

18. The apparatus of claim 16, wherein the instructions to transmit the first subset of the set of duplicate acknowledgment messages are executable by the one or more processors to cause the apparatus to:

transmit the one or more duplicate acknowledgment messages of the set of duplicate acknowledgment messages that are in the buffer as the first subset of the set of duplicate acknowledgment messages.

19. An apparatus for wireless communications at a wireless node, comprising:

means for receiving one or more data messages at the wireless node, the one or more data messages including a plurality of packets that are each associated with a sequence number of a set of sequence numbers, the plurality of packets received with a gap in the set of sequence numbers;

means for forwarding the plurality of packets to a processing layer of the wireless node;

means for accepting, from the processing layer of the wireless node, a set of duplicate acknowledgment messages based at least in part on the plurality of packets being forwarded to the processing layer while having the gap in the set of sequence numbers;

means for identifying a first subset of the set of duplicate acknowledgment messages based on a first number of duplicate acknowledgment messages within the set of duplicate acknowledgment messages; and means for transmitting, via the first subset of the set of duplicate acknowledgment messages, less than all of the set of duplicate acknowledgment messages.

20. The apparatus of claim 19, further comprising:

means for predicting a second number of duplicate acknowledgment messages to be generated;

means for identifying a last duplicate acknowledgment message to be accepted based at least in part on the predicting; and means for refraining from requesting an uplink grant for retransmission of the one or more data messages until after the last duplicate acknowledgment message is accepted.

21. The apparatus of claim 19, further comprising:

means for dropping duplicate acknowledgment messages that are members of the set of duplicate acknowledgment messages but that are outside of the first subset of the set of duplicate acknowledgment messages.

22. The apparatus of claim 19, further comprising:

means for identifying that a buffer includes one or more duplicate acknowledgment messages accepted for packets of the plurality of packets received in sequence; and means for dropping at least the one or more duplicate acknowledgment messages in the buffer, wherein the first subset of the set of duplicate acknowledgment messages that is transmitted includes at least a last-accepted one or more duplicate acknowledgment messages of the set of duplicate acknowledgment messages.

23. The apparatus of claim 19, wherein forwarding the plurality of packets to the processing layer of the wireless node is based at least in part on expiration of a packet data convergence protocol (PDCP) reorder timer expiry.

24. The apparatus of claim 19, wherein forwarding the plurality of packets to the processing layer of the wireless node is based at least in part on radio link control (RLC) automatic repeat request (ARQ) and not on expiration of a packet data convergence protocol (PDCP) reorder timer expiry.

25. The apparatus of claim 24, further comprising:
means for maintaining one or more duplicate acknowledgment messages of the set of duplicate acknowledgment messages in a buffer while ARQ-recovered PDCP packets are forwarded to the processing layer.

26. The apparatus of claim 25, further comprising:
means for accepting an additional duplicate acknowledgment message after expiration of the PDCP reorder timer, the additional duplicate acknowledgment message being added to the set of duplicate acknowledgment messages;
means for dropping the one or more duplicate acknowledgment messages of the set of duplicate acknowledgment messages in the buffer; and
means for transmitting the additional duplicate acknowledgment message as the first subset of the set of duplicate acknowledgment messages.

27. A non-transitory computer-readable medium storing code for wireless communications at a wireless node, the code comprising instructions executable by one or more processors to:
receive one or more data messages at the wireless node, the one or more data messages including a plurality of packets that are each associated with a sequence number of a set of sequence numbers, the plurality of packets received with a gap in the set of sequence numbers;

forward the plurality of packets to a processing layer of the wireless node;
accept, from the processing layer of the wireless node, a set of duplicate acknowledgment messages based at least in part on the plurality of packets being forwarded to the processing layer while having the gap in the set of sequence numbers;
identify a first subset of the set of duplicate acknowledgment messages based on a number of duplicate acknowledgment messages within the set of duplicate acknowledgment messages; and
transmit, via the first subset of the set of duplicate acknowledgment messages, less than all of the set of duplicate acknowledgment messages.

28. The non-transitory computer-readable medium of claim 27, wherein the instructions are executable by the one or more processors to:
predict a second number of duplicate acknowledgment messages to be generated;
identify a last duplicate acknowledgment message to be accepted based at least in part on the predicting; and
refrain from requesting an uplink grant for retransmission of the one or more data messages until after the last duplicate acknowledgment message is accepted.

29. The non-transitory computer-readable medium of claim 27, wherein the instructions are executable by the one or more processors to:
drop duplicate acknowledgment messages that are members of the set of duplicate acknowledgment messages but that are outside of the first subset of the set of duplicate acknowledgment messages.

30. The non-transitory computer-readable medium of claim 27, wherein the instructions are executable by the one or more processors to:
identify that a buffer includes one or more duplicate acknowledgment messages accepted for packets of the plurality of packets received in sequence; and
drop at least the one or more duplicate acknowledgment messages in the buffer, wherein the first subset of the set of duplicate acknowledgment messages that is transmitted includes at least a last-accepted one or more duplicate acknowledgment messages of the set of duplicate acknowledgment messages.

\* \* \* \* \*